(12) United States Patent
Wright et al.

(10) Patent No.: US 8,666,219 B2
(45) Date of Patent: Mar. 4, 2014

(54) TELEPHONE CALL RECORDING INTERFACE CABLE ASSEMBLY FOR SMARTPHONES

(76) Inventors: Randall Edward Wright, Provo, UT (US); Jay Harrison Higbee, Provo, UT (US)

( * ) Notice: Subject to any disclaimer, the term of this patent is extended or adjusted under 35 U.S.C. 154(b) by 9 days.

(21) Appl. No.: 13/450,300

(22) Filed: Apr. 18, 2012

(65) Prior Publication Data
US 2012/0264485 A1  Oct. 18, 2012

Related U.S. Application Data

(60) Provisional application No. 61/476,620, filed on Apr. 18, 2011.

(51) Int. Cl.
*H04N 5/77* (2006.01)
(52) U.S. Cl.
USPC .................................. 386/224; 386/E05.069
(58) Field of Classification Search
USPC .................................................. 455/557, 559
See application file for complete search history.

(56) References Cited

U.S. PATENT DOCUMENTS

2011/0038594 A1*  2/2011  Symons et al. ............... 386/224

* cited by examiner

*Primary Examiner* — Creighton Smith
(74) *Attorney, Agent, or Firm* — Angus C. Fox, III

(57) ABSTRACT

An interface cable assembly, which enables the user of either an iPhone® or Android® smartphone to record both incoming and outgoing telephone conversations on a standard dual channel (stereo) audio recorder in either WMA or MP3 format, includes one four-conductor plug that engages the audio input/output jack of the smartphone, one three-conductor plug that engages the dual-channel input jack of an audio recorder, and one four-conductor jack that engages the plug of a standard earphone and microphone assembly. In addition, the cable assembly includes resistors and capacitors which provide an impedance match between the input/output circuitry and the audio recorder input circuitry. In order to clearly distinguish between the participants in a recorded telephone conversation, outgoing voice signals are recorded on one channel of the audio recorder, while incoming voice signals are recorded on the other channel.

16 Claims, 4 Drawing Sheets

TELEPHONE CALL RECORDING INTERFACE CABLE ASSEMBLY FOR SMARTPHONES

This application has a priority date based on the filing of Provisional Patent Application Ser. No. 61/476,620 of the same title on Apr. 18, 2011.

FIELD OF THE INVENTION

This invention relates, generally, to smartphone accessories. More particularly, it relates to cable assemblies for connecting earphones and an audio recorder to a smartphone.

BACKGROUND OF THE INVENTION

A smartphone is a mobile phone that offers more advanced computing ability and connectivity than a contemporary basic feature phone. Smartphones are essentially handheld computers integrated within a mobile telephone. Growth in demand for smartphones boasting powerful processors, abundant memory, larger screens, and open operating systems has outpaced the rest of the mobile phone market for several years. According to a study by ComScore, over 45.5 million people in the United States owned smartphones in 2010 and it is the fastest growing segment of the mobile phone market, which comprised 234 million subscribers in the United States.

The first smartphone, called Simon, was designed by IBM in 1992, released to the public in 1993 and sold by BellSouth. Besides being a mobile phone, it also contained a calendar, address book, world clock, calculator, note pad, e-mail, send and receive fax, and games. Customers used a touch-screen to select phone numbers with a finger or create facsimiles and memos with an optional stylus. Text was entered with a unique on-screen "predictive" keyboard.

In 1997 Ericsson released the concept phone GS88—the first device labeled as a smartphone. In 2000 Ericsson released the touchscreen smartphone R380, the first device to use the new Symbian OS. It was followed up by P800 in 2002, the first camera smartphone.

In 2001, Microsoft announced that its Windows CE Pocket PC operating system (OS) would be offered as Microsoft Windows Powered Smartphone 2002. Microsoft originally defined its Windows Smartphone products as lacking a touch-screen and offering a lower screen resolution compared to its sibling Pocket PC devices.

In early 2002, Handspring released the Palm OS Treo smartphone, utilizing a full keyboard that combined wireless web browsing, email, calendar, and contact organizer with mobile third-party applications that could be downloaded or synced with a computer.

Also in 2002, Research In Motion (RIM) released the first BlackBerry, which was the first smartphone optimized for wireless email use. By December 2009, it had achieved a total customer base of 32 million subscribers by December 2009.

In 2007 Nokia launched the Nokia N95, a consumer-oriented smartphone which integrated a wide range of features: GPS, a 5 megapixel camera with autofocus and LED flash, 3G and wi-fi connectivity, and TV-out. In the next few years these features would become standard on high-end smartphones.

Later in 2007, Apple Inc. introduced its first iPhone®. It was initially expensive—costing $500 for the cheaper of two models on top of a two year contract. It was one of the first smartphones to be mainly controlled through its touchscreen (the others being the LG Prada and the HTC Touch, which were also released in 2007). Not only was it the first mobile phone to use a multi-touch interface, it also featured it featured a web browser that was vastly superior to those in use by its competitors. Though Steve Jobs publicly stated that the iPhone lacked 3G support due to the immaturity, power usage, and physical size requirements of 3G chipsets at the time, it was rumored that the CDMA2000 Network Providers (Verizon and Sprint) refused to allow the iPhone on their network because Jobs wanted total control of the application store associated with the iPhone. In July 2008, Apple introduced its second generation iPhone which had a lower upfront price and 3G support. It also created the App Store with both free and paid applications. The App Store can deliver smartphone applications developed by third parties directly to the iPhone or iPod Touch over wifi or cellular network without using a PC to download. The App Store has been a huge success for Apple and by April 2010 hosted more than 185,000 applications. The App Store hit three billion application downloads in early January 2010. The iPhone 3GS was the third generation of iPhone designed and marketed by Apple Inc. Introduced on Jun. 8, 2009, it provided faster performance, a camera with higher resolution and video capability, voice control, and support for 7.2 Mbit/s HSDPA downloading. The iPhone 4, which is the fourth generation iPhone, is particularly marketed for video calling, consumption of media such as books and periodicals, movies, music, and games, and for general web and e-mail access.

Android®, a cross platform operating system for smartphones, was released in 2008. Android is an Open Source platform backed by Google, along with major hardware and software developers (such as Intel, HTC, ARM, Motorola and Samsung, to name a few), that form the Open Handset Alliance. The first phone to use the Android OS was the HTC Dream, branded for distribution by T-Mobile as the G1. The software suite included on the phone consists of integration with Google's proprietary applications, such as Maps, Calendar, and Gmail, and a full HTML web browser. Third-party applications (apps) are available via the Android Market, including both free and paid apps. When released by Sprint Nextel on Jun. 1, 2010, the HTC Evo set the standard, not only for other Android smartphones, but all other smart phones as well. The Evo featured a 1 GHz QSD 8650 processor, a 4.3-inch WVGA resolution capacitive multi-touch screen, an 8 megapixel rear-facing camera with auto focus and 2×LED flash, a 1.3 megapixel fixed-focus front-facing web-cam, 1 GB of ROM, 512 MB of RAM, 8 GB of installed onboard storage, a microSD memory card slot, 802.11 b/g connectivity, GPS/aGPS, HDMI out, and a mobile Wi-Fi router. As of the third quarter of 2010, 43.6 percent of the smartphones sold in the U.S. used the Android OS, up 11 percent from the previous quarter and up from only 2 percent the previous year. Apple came in second with 23 percent, up 1 percent, followed by RIM in third place, which declined from 28 percent to 22 percent.

Apple Computer and Google have very different philosophies. Apple has taken a Chairman Mao approach to handset management and application availability: It knows what is best for the proletariat. Consistent with that philosophy, Apple has designed its iPhones and the resident operating systems so that it is impossible to directly record telephone conversations. There are, presently, two approaches to circumventing this stumbling block to full control over an Apple smartphone. The first approach involves the routing of calls through a third-party service, such as Google voice, and recording the conversations on third-party servers. The problem with this first approach is that the smartphone user loses custody and control of the recorded conversation. The second approach is to "jailbreak" the Apple smartphone. This term signifies gaining unauthorized access to the root directory of iOS (the iPhone's Free-BSD-based operating system) and altering internal operating system function. One jailbreak application, titled SpoofApp, allows an iPhone user to change the caller ID received by person being called, changes the voice of the caller or records telephone calls. SpoofCard is the Caller ID Spoofing provider, used in combination with SpoofApp with purchased minutes, that handles the actual phone calls. When a call is initiated with SpoofApp on a telephone, the call information along with personal identification number (PIN), that identifies the caller, is transmitted to SpoofCard. Calls are routed through SpoofCard's servers, where the caller ID spoofing, voice changing or call recording actually takes place. Thus, SpoofApp provides the application and interface, while SpoofCard provides the requested phone services. In some states recording phone calls is illegal unless both parties know the recording is taking place. That is why calls to customer service representatives invariably have a recording which states that all or part of the phone conversation may be recorded.

Google, on the other hand, has taken what can be considered more of a hands-off approach to handset management and application availability. Thus, applications can readily be downloaded which will record telephone conversations on smartphones running the Android operating system. For example, the free application AllCallRecorder (the current version, as of April 2011, is 1.15.1) records both incoming and outgoing calls on Android smartphones. Telephone conversations are saved as digital files in 3GPP format, a multimedia container format defined by the Third Generation Partnership Project (3GPP) for 3G UMTS multimedia services. The format is used on 3G mobile phones but can also be played on some 2G and 4G phones. Recorded calls can be delivered via bluetooth, e-mail, and other digital transmission methods. The AllCallRecorder application has garnered its share of negative reviews. Android users complain about crashes, failure to record, choppy playback, and inability to work on certain models of Android smartphones. They also complain about the 3GPP file format, and want to know why a more standard format such as WMA, WAV, or MP3 is not used. WMA, or Windows Media Audio, is a proprietary audio data compression technology developed by Microsoft. WAV, WAVE, or Waveform Audio File Format is a Microsoft and IBM audio file format standard for storing an audio bitstream, encoded with linear pulse-code modulation, on Windows-based personal computers. is a patented digital audio encoding format using a form of lossy data compression. It is a common audio format for consumer audio storage, as well as a de facto standard of digital audio compression for the transfer and playback of music on digital audio players. MP3 is an audio-specific encoding format that was designed by the Moving Picture Experts Group as part of its MPEG-1 standard and later extended in MPEG-2 standard. MP3 uses a form of lossy data compression that is designed to greatly reduce the amount of data required to represent the audio recording, which still sounds like a faithful reproduction of the original uncompressed audio to most listeners. An MP3 file created using the setting of 128 kbits will result in a file that is about 11 times smaller than the CD file created from the original audio source. An MP3 file can also be constructed at higher or lower bit rates, with higher or lower resulting quality. Data compression is accomplished using psychoacoustic models, which discards or reduces the precision of sound components that are less audible to human hearing, and then records the remaining information in an efficient manner.

What is needed is an apparatus which enables an iPhone user to record both incoming and outgoing telephone conversations in common audio file formats, without losing custody and control over the recorded conversations, and without the need to alter the internal function of the iOS operating system.

SUMMARY OF THE INVENTION

The present invention provides an interface cable assembly, which enables the user of an iPhone smartphone or an Android smartphone to record both incoming and outgoing telephone conversations on a standard dual channel (stereo) audio recorder. The interface cable assembly includes one four-conductor plug that engages the audio input/output jack of the smartphone, one three-conductor plug that engages the dual-channel input jack of an audio recorder, and one four-conductor jack that engages the plug of a standard smartphone earphone and microphone assembly. In addition, the cable assembly includes resistors and capacitors which provide an impedance match between the smartphone input/output circuitry and the audio recorder input circuitry. In variance from convention, the sleeve of the smartphone earphone/microphone plug is for microphone input (rather than ground), while ring 2 (the ring farthest from the tip) on the plug is for the ground conductor. In order to clearly distinguish between the participants in a recorded telephone conversation, outgoing voice signals are recorded on one channel of the audio recorder, while incoming voice signals are recorded on the other channel. As most consumer audio recorders create audio files having either WMA or MP3 format, conversations are recorded as files which are eminently usable. Though originally designed for the recording of telephone conversations taking place through an iPhone, it has been found that the interface cable also works with most Android smartphones. This enables users to avoid Android recording applications which have, at times, proven to be unreliable.

PREFERRED EMBODIMENT OF THE INVENTION

Figure 1:
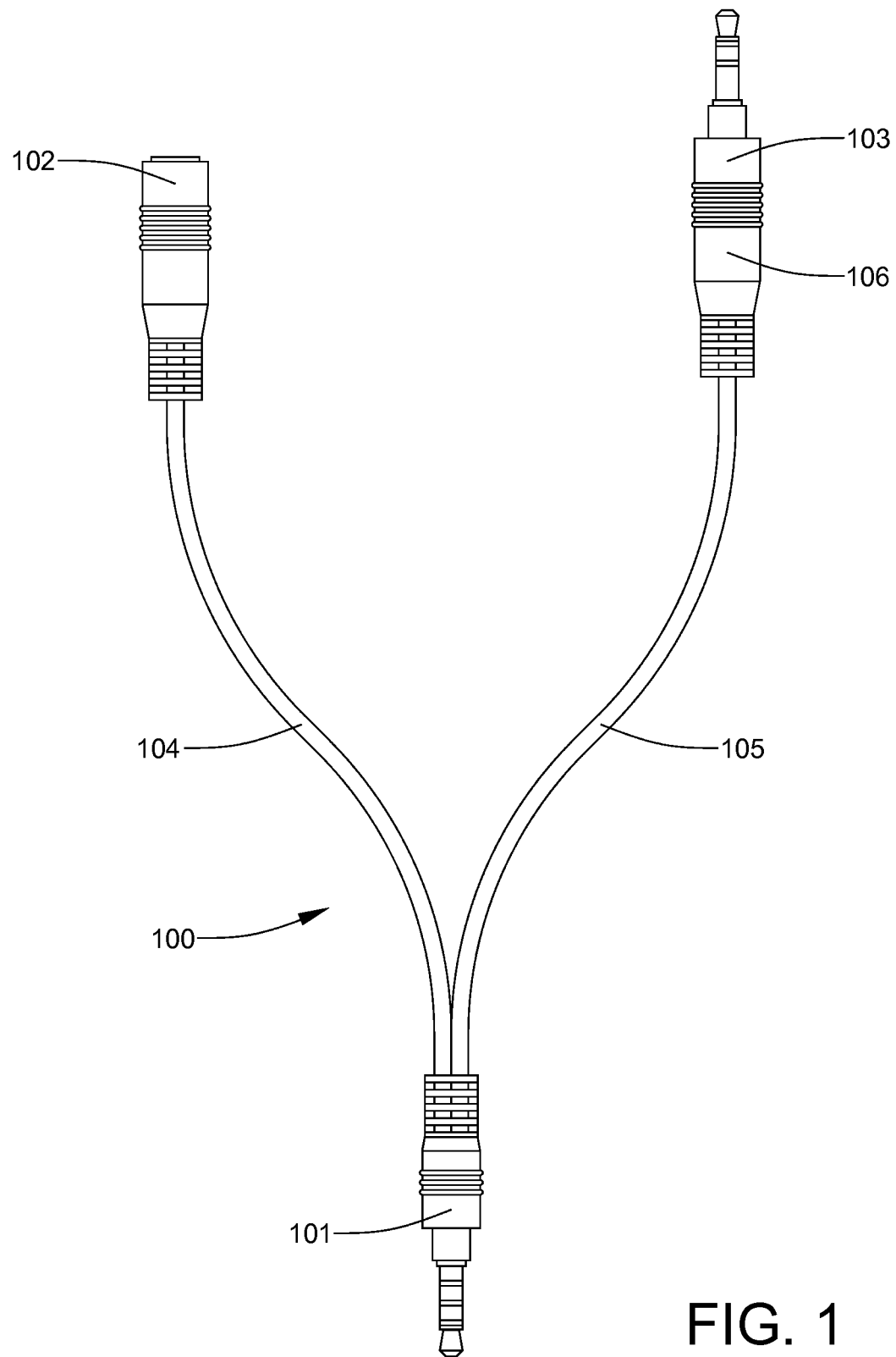
FIG. 1 is a plan view of the interface cable assembly.

The telephone call recording interface cable assembly for smartphones will now be described in detail with reference to the attached drawing figures. It should be understood that the drawing figures may not be drawn to exact scale, and that they are meant to be merely illustrative of the invention.

Referring now to FIG. 1, the telephone call recording interface cable assembly 100 enables the user of a smartphone to record both incoming and outgoing telephone conversations on a standard dual channel (stereo) audio recorder. The interface cable assembly 100 includes one four-conductor plug 101 that engages the audio input/output jack of the smartphone, one four-conductor jack 102 that engages the plug of a standard iPhone or Android smartphone earphone and microphone assembly, and one three-conductor plug 103 that engages the dual-channel input jack of an audio recorder (not shown in this drawing figure). The four-conductor plug 101 is coupled to the four-conductor jack 102 with a first four-conductor cable 104, and to the three-conductor plug 103 with a second four-conductor cable 105. The use of a four-conductor cable 105 between the four-conductor plug 101 and the three-conductor plug 103 enables the positioning of all discrete electrical components required for the interface (to wit, three resistors and two capacitors) within the insulative cap 106 of the three-conductor plug 103. Though originally designed for the recording of telephone conversations taking place through an iPhone, it has been found that the interface cable 100 also works well with most Android smartphones. This enables users to avoid Android recording applications which have, at times, proven to be unreliable.

Figure 2:
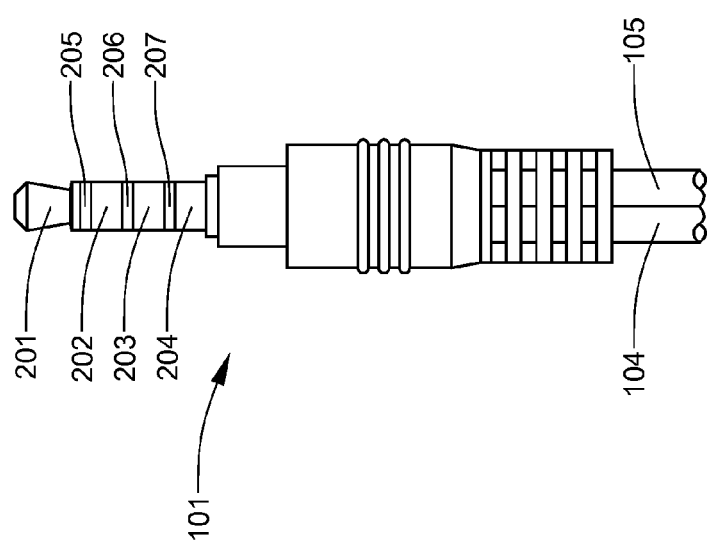
FIG. 2 is an enlarged view of the four-conductor plug used in conjunction with a smartphone.

Referring now to FIG. 2, the individual male conductors of the four-conductor plug 101, which engages the audio input/output jack of the smartphone, are identified. The tip conductor 201 is followed by a first ring and inner sleeve conductor 202, a second ring and inner sleeve conductor 203, and an outer sleeve conductor 204. The tip conductor 201 and the first ring and inner sleeve conductor 202 are separated by a first ring and inner sleeve insulator 205; the first ring and inner sleeve conductor 202 and the second ring and inner sleeve conductor 203 are separated by a second ring and inner sleeve insulator 206; and the second ring and inner sleeve conductor 203 and the outer sleeve conductor 204 are separated by a third ring and inner sleeve insulator 207. Four-conductor electrical cables 104 and 105 project from the end of the plug 101 opposite the tip conductor 201. Though not shown, it should be understood that the female conductors within the four-conductor jack 102 are spaced to mate with the male conductors of a standard smartphone earphone and microphone assembly plug, which is identical to plug 101. The female conductors within the four-conductor jack 102, are directly coupled with copper conductors (i.e., wires) to their respective counterparts in the four-conductor plug 101.

Figure 3:
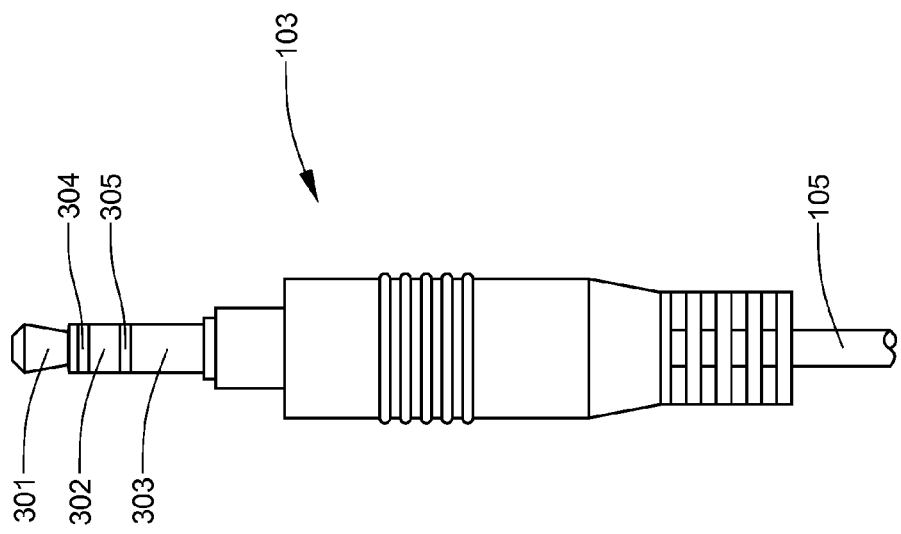
FIG. 3 is an enlarged view of the three-conductor plug used in conjunction with a standard stereo audio recorder.

Referring now to FIG. 3, the individual male conductors of the three-conductor plug 103, which engages the dual-channel input jack of an audio recorder, are identified. The tip conductor 301 is followed by a first ring and inner sleeve conductor 302, and an outer sleeve conductor 303. The tip conductor 301 and the first ring and inner sleeve conductor 302 are separated by a first ring and inner sleeve insulator 304; the first ring and inner sleeve conductor 302 and the outer sleeve conductor 303 are separated by a second ring and inner sleeve insulator 305. The four-conductor electrical cables 105 projects from the end of the plug 103 opposite the tip conductor 301.

Figure 4:
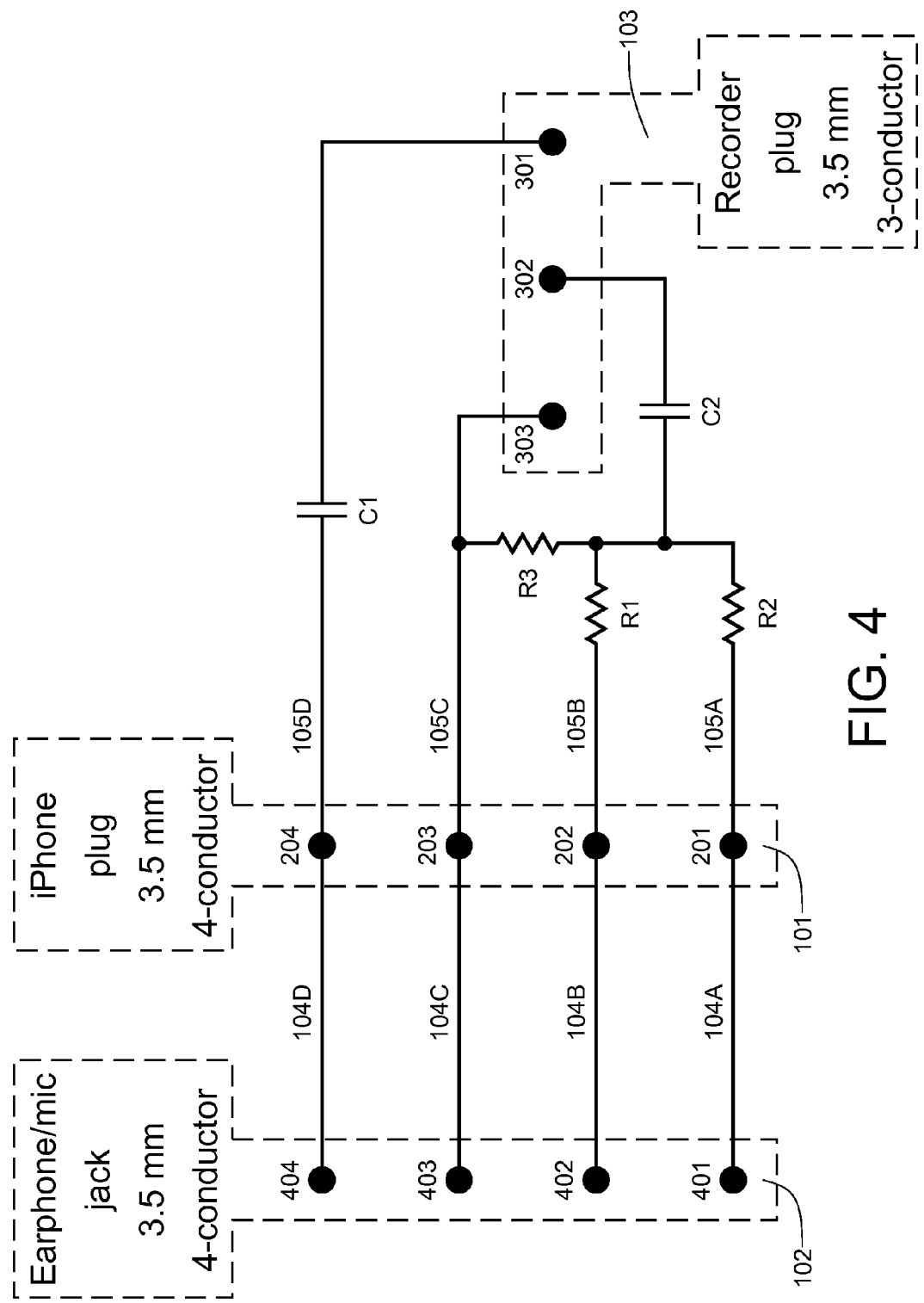
FIG. 4 is a circuit diagram of the interface cable assembly which shows all electrical components required for impedance matching between a smartphone and standard stereo audio recorder.

Referring now to FIG. 4, the circuit diagram identifies the conductors and individual electrical components used to interconnect the four-conductor plug 101, the four-conductor jack 102, and the three-conductor plug 103. The male conductor rings and male conductor sleeves on the four-conductor plug 101 and the three-conductor plug 103 are identified by number, and correspond to those in FIGS. 2 and 3, respectively. Likewise, the female conductor contacts of the jack 102, which were not specifically shown in previous drawing figures, are identified in FIG. 4 as 401, 402, 403 and 404. Female conductor contact 403, conductor ring 203, and conductor sleeve 303 are grounded connections when coupled to their respective devices. Copper conductors 104A, 104B, 104C and 104D are the individual copper conductors within cable 104, which is shown in its entirety in FIG. 1. Likewise, copper conductors 105A, 105B, 105C and 105D are the individual copper conductors within cable 105, which is also shown in its entirety in FIG. 1. The monophonic input from the electret microphone of the earphone and microphone assembly is presented at sleeve conductor 404, from whence it is transported over conductor 104D to sleeve conductor 204 and thence to tip conductor 301 via copper conductor 105D through capacitor C1. Capacitor C1, which is a 2.2 µf ceramic capacitor, isolates the channel 1 input of the stereo recorder (not shown) from any DC voltages. The stereo audio output channels 1 and 2 from an iPhone or Android smartphone are available at the tip conductor 201 and at the first ring and inner sleeve conductor 202, respectively, of the four-conductor smartphone plug 101. It should be clear that for telephone calls, which are monaural, channels 1 and 2 carry identical signals. The stereo outputs from the smartphone are transported to the tip conductor 401 and the first ring conductor 402 of the four-conductor jack 102 via copper conductors 104A and 104B, respectively. However, for the recorder input, the outputs from the smartphone stereo channels 1 and 2 are combined and passed through capacitor C2 to conductor ring 302 of the three conductor plug 103. Capacitor C2, which is also a 2.2 µf ceramic capacitor, isolates the channel 2 input of the stereo recorder (not shown) from any DC voltages. Resistors R1 and R2 both have resistive values of 22.1 kΩ, while resistor R3 has a resistive value of 604Ω. Resistors R1 and R2 each form a voltage divider with resistor R3, which drops the combined signal intensity of both channels to a level about equal to that of the signal from the electret microphone, which is being sent to the channel 1 input of the recorder through tip conductor 301 of the three-conductor plug 103.

Figure 5:
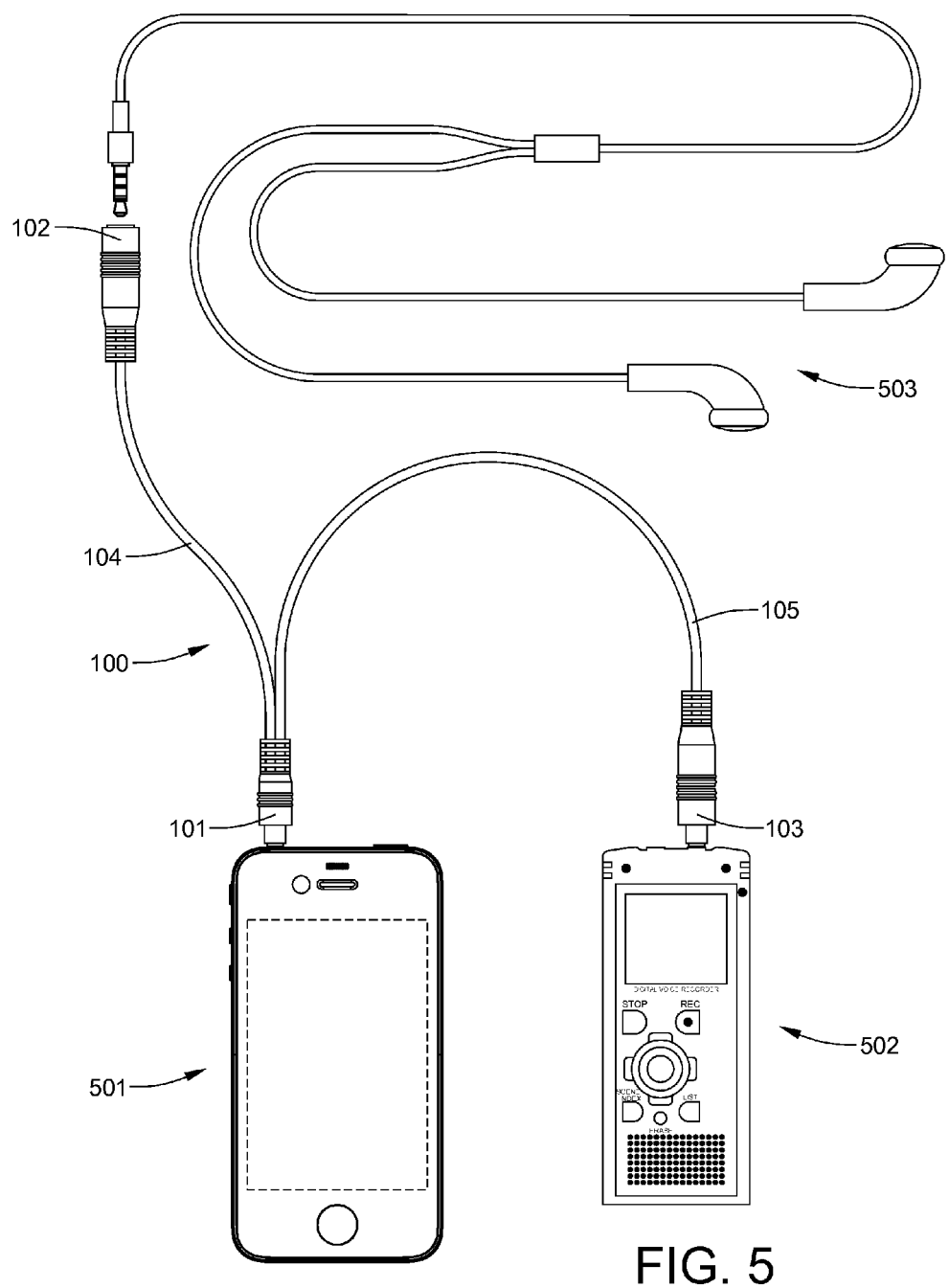
FIG. 5 is a top plan view of an iPhone, an audio recorder are interconnected with the interface cable assembly of the present invention, with an earphone assembly ready for interconnection with the interface cable assembly.

Referring now to FIG. 5, an iPhone® 501 and a digital audio recorder 502 are shown interconnected with the interface cable assembly 100 of the present invention. Only a single channel of the digital audio recorder 502 is used to record the monaural telephone conversation. An earphone assembly 503 is shown ready to plug into the interface cable assembly 100.

The telephone call recording interface cable assembly 100 can also be used to input telephone messages to a desktop computer, a laptop computer, a notebook computer, a netbook computer, or to a iPad® or Android tablet computer. This may be accomplished by utilizing a device such as the Griffin iMic USB Audio Interface. The device has both audio input and output jacks, as well as a type-A USB cable interface. The cable interface can be plugged directly into one of the USB ports of a desktop, laptop, notebook or netbook computer. The analog stereo input signals can be converted to stereo digital signals with one of many available analog-to-digital converter programs, many of which are available at no cost, and thereafter stored as a digital file on any available digital storage medium, such as the computer's hard drive, a solid-state drive, or on an external hard flash memory. Various adapters are available for converting a USB type-A use plug into a plug that will fit into the dock connector of an Apple iPad or Android tablet computer. For example, the iPad Camera Connection Kit includes two connectors, one of which features a USB type-A interface. Thus, in order to directly connect an iPhone to an iPad, the following components would be required:

the telephone call recording interface cable assembly 100 of the present invention, a USB audio interface (e.g., the iMic Audio Interface marketed by Griffin), and the dock connector having the USB interface from an iPad Camera Connection Kit. The connection of an iPhone or an Android smartphone to an Android tablet computer may be made in a similar manner using a USB audio interface (e.g., the iMic Audio Interface marketed by Griffin) and an appropriate dock connector having a USB type-A interface.

Although only a single embodiment of the telephone call recording interface cable assembly 100 is shown and described, it will be obvious to those having ordinary skill in the art that changes and modifications may be made thereto without departing from the scope and the spirit of the invention as may be hereinafter claimed.

What is claimed is:

1. An interface cable assembly, which enables a user of a smartphone to record both incoming and outgoing telephone conversations on a dual channel audio recorder in either WMA or MP3 format, said interface cable assembly comprising:
    a four-conductor plug that engages an audio input/output jack of the smartphone;
    a three-conductor plug that engages a dual-channel input jack of the audio recorder, said three-conductor plug coupled to said four-conductor plug via a first length of cable; and
    a four-conductor jack that engages a plug of a standard earphone/microphone assembly, said four-conductor jack also coupled to said four-conductor plug via a second length of cable;
    wherein the coupling of said four-conductor plug to said three-conductor plug employs resistors and capacitors which provide an impedance match between input/output circuitry of the smartphone and input circuitry of the audio recorder.

2. The interface cable assembly of claim 1, wherein, so as to clearly distinguish between participants in a recorded telephone conversation, outgoing voice signals are recorded on one channel of the dual-channel audio recorder, while incoming voice signals are recorded on the other channel.

3. The interface cable assembly of claim 1, wherein said first and second lengths of cable contain four conductors.

4. The interface cable assembly of claim 3, wherein said resistors and capacitors required for impedance matching are all located within an insulative cap of the three conductor plug.

5. The interface cable assembly of claim 1, wherein stereo outputs from the smartphone are combined and recorded on a single channel of the audio recorder.

6. The interface cable assembly of claim 5, wherein series-coupled resistors are used to drop an intensity level of each of the smartphone stereo outputs, so that when combined, they have an intensity level about equal to an output intensity level of an electret microcphone of the earphone/microphone assembly.

7. The interface cable assembly of claim 6, wherein the smartphone stereo outputs and a microphone output of the earphone/microphone assembly are all capacitively coupled to the input circuitry of the audio recorder so as to protect the latter from any DC voltages.

8. An interface cable assembly, which enables a user of a smartphone to record both incoming and outgoing telephone conversations on a dual channel audio recorder in either WMA or MP3 format, said interface cable assembly comprising:
    a four-conductor plug that engages an audio input/output jack of the smartphone;
    a three-conductor plug that engages a dual-channel input jack of the audio recorder, said three-conductor plug coupled to said four-conductor plug via a first length of four-conductor cable; and
    a four-conductor jack that engages a plug of a standard earphone/microphone assembly, said four-conductor jack also coupled to said four-conductor plug via a second length of four-conductor cable;
    wherein the coupling of said four-conductor plug to said three-conductor plug employs resistors and capacitors which provide an impedance match between input/output circuitry of the smartphone and input circuitry of the audio recorder, said resistors and capacitors all being located within an insulative cap of the three-conductor plug.

9. The interface cable assembly of claim 8, wherein, so as to clearly distinguish between participants in a recorded telephone conversation, outgoing voice signals are recorded on one channel of the dual-channel audio recorder, while incoming voice signals are recorded on the other channel.

10. The interface cable assembly of claim 8, wherein stereo outputs from the smartphone are combined and recorded on a single channel of the audio recorder.

11. The interface cable assembly of claim 10, wherein series-coupled resistors are used to drop an intensity level of each of the smartphone stereo outputs, so that when combined, they have an intensity level about equal to an output intensity level of an electret microcphone of the earphone/microphone assembly.

12. The interface cable assembly of claim 11, wherein the smartphone stereo outputs and a microphone output of the earphone/microphone assembly are all capacitively coupled to the input circuitry of the audio recorder so as to protect the latter from any DC voltages.

13. An interface cable assembly, which enables a user of a smartphone to record both incoming and outgoing telephone conversations on a dual channel audio recorder in either WMA or MP3 format, said interface cable assembly comprising:
    a four-conductor plug that engages an audio input/output jack of the smartphone;
    a three-conductor plug that engages a dual-channel input jack of the audio recorder, said three-conductor plug coupled to said four-conductor plug via a first length of four-conductor cable; and
    a four-conductor jack that engages a plug of a standard earphone/microphone assembly, said four-conductor jack also coupled to said four-conductor plug via a second length of four-conductor cable;
    wherein the coupling of said four-conductor plug to said three-conductor plug employs two resistors to drop output intensity of the smartphone stereo output channels to levels comparable to an output intensity from the microphone of the earphone/microphone assembly, and further employs capacitors to capacitively couple the smartphone stereo outputs and the microphone output to the audio recorder; and
    wherein said resistors and capacitors are all located within an insulative cap of the three-conductor plug.

14. The interface cable assembly of claim 13, wherein, so as to clearly distinguish between participants in a recorded telephone conversation, outgoing voice signals are recorded on one channel of the dual-channel audio recorder, while incoming voice signals are recorded on the other channel.

15. The interface cable assembly of claim 13, wherein stereo outputs from the smartphone are combined and recorded on a single channel of the audio recorder.

16. The interface cable assembly of claim 13, wherein capacitive coupling is employed to protect the inputs of the audio recorder from any DC voltages.

* * * * *